United States Patent Office 3,642,705
Patented Feb. 15, 1972

3,642,705
FLUORINE-CONTAINING POLYURETHANE RUBBERS
Joseph La Mar Zollinger, Maplewood, Minn., assignor to Minnesota Mining and Manufacturing Company, St. Paul, Minn.
No Drawing. Filed Sept. 27, 1968, Ser. No. 763,404
Int. Cl. C08g 22/00
U.S. Cl. 260—77.5 AP   12 Claims

ABSTRACT OF THE DISCLOSURE

Methylol-terminated polyperfluoroalkylene oxide is reacted with a polyisocyanate to form a fluorine-containing polyurethane rubber, which can be formed in the shape of a seal or gasket or can be used as a structural adhesive or a solid propellant binder.

FIELD OF INVENTION

This invention relates to fluorine-containing polyurethanes, and their preparation. In another aspect, it relates to a solid propellant comprising said polyurethanes as a binder therefor. In another aspect, it relates to an admixture of a methylol-terminated polyperfluoroalkylene oxide and polyisocyanate, said admixture being useful as a structural adhesive or solid propellant binder. In a further aspect, it relates to fluorine-containing aliphatic diisocyanates, and fluorine-containing aliphatic diamine precursors thereof, and to methods for their preparation. In a still further aspect, it relates to an ether-containing aliphatic diisocyanate, and a method for its preparation.

BACKGROUND OF THE PRIOR ART

Polyurethanes have been prepared in the past by reacting hydroxyl-containing hydrocarbon polymers, such as poly(oxypropylene) triols, with aliphatic or aromatic diisocyanates. Such prior art polyurethanes, though widely useful for many applications, do not have the thermal and oxidative stability required for many other applications (such as those needed in the aerospace industry). Recently, fluorine-containing polyurethanes have been disclosed in the art which do have some thermal and oxidative stability, but they and their methods of preparation suffer from a number of disadvantages or limitations, as discussed below.

In Vysokomolekulyarnye Soedineiya vol. (A) 9, No. 11, p. 2482 (1967) and Jour. of Polymer Sci. Part A–1, vol. 5, p. 2757 (1967), non-rubbery fluorine-containing polyurethanes are disclosed as being prepared by either the reaction of chloroformate derivatives of hydroxy compounds with fluorine-containing diamines (which reaction evolves corrosive, bubble-forming hydrogen chloride) or the reaction of fluorine-containing hydroxy compounds (rather than prepolymers) with aliphatic diisocyanates. Further, these polyurethanes have a high ratio of urethane groups to the total weight of the polymer, and consequently a low fluorine content. NASA publication No. SP–5901(01), p. 14 (1968), published by NASA's Office of Technology Utilization, discloses fluorine-containing polyurethanes (with allophanate crosslinks, which are less stable than urethane crosslinks) prepared by reaction of a large excess of aliphatic diisocyanate with hydroxyl- and fluorine-containing prepolymers having hydroxyl functionalities typically less than two, using undesirably high reaction temperatures.

BRIEF DESCRIPTION OF INVENTION

Briefly, the fluorine-containing polyurethanes of this invention are prepared by reacting polyisocyanates with methylol-terminated poly(perfluoroalkylene oxide) prepolymers having average hydroxyl functionalities greater than two, e.g., 2.5. The methylol-terminated prepolymers and their preparation are disclosed in copending application Ser. No. 763,357, filed concurrently herewith by R. A. Mitsch. The polyisocyanates preferred in preparing these polyurethanes are the conventional aliphatic or aromatic diisocyanates, or, more preferably, are novel fluorine-containing aliphatic diisocyanates prepared from novel fluorine-containing aliphatic diamines.

The polyurethanes of this invention are solid, rubbery, crosslinked polymers of high molecular weight with a high fluorine content and highly useful degrees of thermal, oxidative, and hydrolytic stability. The methylol-terminated prepolymer and diisocyanate reactants can be admixed to form a viscous, pourable homogeneous solution which can be cast in a mold and heated to effect crosslinking and solidification at relatively low temperature, e.g., 60–80° C., or even room temperature if a catalyst is used, without the evolution of hydrogen chloride or other volatile by-products, to form a shaped article, such as an O-ring, gasket, etc. Solid rocket propellants of the composite type can be prepared in a conventional manner, using the said solution of prepolymer and diisocyanate as a high density thermoset binder for the propellant. Where the diisocyanate used is said fluorine-containing aliphatic diisocyanate, the thermal and oxidative stability of the resultant polyurethane will be even higher than that obtained when non-fluorinated, conventional aliphatic or aromatic diisocyanates are used to prepare the polyurethanes of this invention.

DETAILED DESCRIPTION OF THE INVENTION

The methylol-terminated polyperfluoroalkylene oxide prepolymer used in this invention can be prepared as described in copending application Ser. No. 763,357 filed concurrently herewith by R. A. Mitsch, which involves photolyzing oxy di(perfluoroacyl fluorides) to form acyl fluoride-terminated polyperfluoroalkylene oxides, and then reducing the latter, e.g., with lithium aluminum hydride, to form the methylol-terminated derivatives, the teaching of said copending application being incorporated herein by reference. Said methylol-terminated polyperfluoroalkylene oxide prepolymers disclosed in said copending application have backbone segments of repeating units of the formula

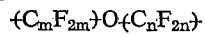

and, where said prepolymers have end group functionalities greater than 2, the backbone will also have one or more random branched segments of the formula

where R is a side chain of repeating units having said formula $-(C_mF_{2m})-O-(C_nF_{2n})-$.

As mentioned above, the methylol-terminated prepolymer reactant will have an average hydroxyl functionality of greater than two, thus enabling one to use only a stoichiometric amount of a di-functional isocyanate to produce a useful rubbery polyisocyanate with crosslinks that are essentially or entirely of the urethane type. Generally, for use in this invention said average hydroxyl functionality will be in the range of 2.1 to 5, preferably 2.1 to 2.8, since such prepolymers will be normally liquids, with the average molecular weights of these prepolymers being from 500 to 10,000, preferably 1,000 to 4,000. An example of a methylol-terminated polyperfluoroalkylene oxide prepolymer which can be used is one with an average hydroxyl functionality of 2.5, comprising an admixture of the following two prepolymers each in equal gram equivalent amounts:

(1) 

and (2) 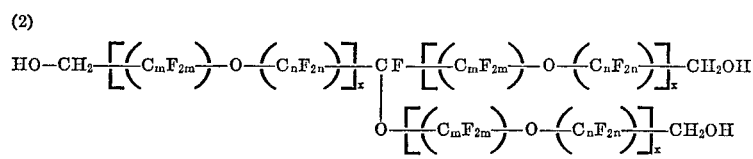

where $m$ and $n$ are integers from 1 to 8, and $x$ is an average integer from 2 to 8. In addition to the di- and tri-functional material in such mixture, tetra- and penta-functional material may be present in small amounts. In Table I below, the properties of a typical methylol-terminated prepolymer are listed for such a mixture, where $m$ and $n$ in the above formulas are each equal to 2 and $x$ is an average of 6.

TABLE I

Average hydroxyl functionality—2.6
Number average molecular weight—1700
Equivalent weight—650
Viscosity (neat at 65° C.)—4–5 poises
Glass transition temperature—ca. —55° C.

The polyisocyanates which are admixed and reacted with the methylol-terminated prepolymers can be conventional aliphatic or aromatic diisocyanates. Representative of these diisocyanates which can be used include:
benzene-1,3-diisocyanate;
benzene-1,4-diisocyanate;
hexamethylene diisocyanate;
toluene-2,4-diisocyanate;
toluene-2,5-diisocyanate;
diphenylmethane-4,4'-diisocyanate;
diphenyl-4,4'-diisocyanate;
2-chloropropane-1,3-diisocyanate;
diphenyl-3,3'-dimethoxy-4,4'-diisocyanate;
naphthalene-1,5-diisocyanate;
pentamethylene diisocyanate;
tetramethylene diisocyanate;
octamethylene diisocyanate;
dimethylene diisocyanate;
propylene-1,2-diisocyanate;
benzene-1,2,4-triisocyanate;
toluene-2,3-diisocyanate;
diphenyl-2,2'-diisocyanate;
naphthalene-2,7-diisocyanate;
naphthalene-1,8-diisocyanate;
toluene-2,4,6-triisocyanate;
benzene-1,3,5-triisocyanate;
benzene-1,2,3-triisocyanate;
cyclohexane triisocyanate;
toluene-2,3,4-triisocyanate;
polymethylene polyphenyl isocyanate;

and the like.

A preferred class of diisocyanates which can be used in this invention are fluorine-containing aliphatic ether or non-ether diisocyanates of the general formulas:

(3) 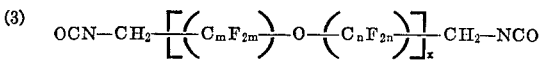

(4) 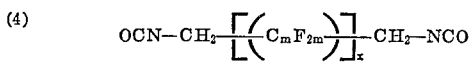

where $m$ and $n$ are as defined above in Formulas 1 and 2, and $x$ are integers of 1 to 12, preferably 1 to 8. These novel diisocyanates can be named as $\alpha,\omega$-bis(1,1-dihydro-isocyanates). Preferred subclasses of these diisocyanates are those of the general formulas:

(5)   $OCN-CH_2(CF_2)_aO(CF_2)_b-CH_2-NCO$ (6)   $OCN-CH_2(CF_2)_aO(CF_2)_bO(CF_2)_cCH_2-NCO$ (7)   $OCN-CH_2[(CF_2)_aO(CF_2)_b]_cCH_2-NCO$ (8)   $OCN-CH_2(CF_2)_aCH_2NCO$ where $a$, $b$, and $c$ are integers each preferably in the range of 1 to 8, the sum of which in each such formula is preferably 16 or less. Representative fluorine-containing diisocyanates of this type which can be used include $CF_2(CH_2NCO)_2$, $(CF_2CH_2NCO)_2$, $CF_2(CF_2CH_2NCO)_2$ $(CF_2CF_2CH_2NCO)_2$, $CF_2(CF_2CF_2CH_2NCO)_2$ $(CF_2CF_2CF_2CH_2NCO)_2$, $CF_2(CF_2CF_2CF_2CH_2NCO)_2$ $(CF_2CF_2CF_2CF_2CH_2NCO)_2$, $O(CF_2CH_2NCO)_2$ $O(CF_2CF_2CH_2NCO)_2$, $O(CF_2CF_2CF_2CH_2NCO)_2$ $OCNCH_2(CF_2)_2O(CF_2)_3CH_2NCO$ $OCNCH_2CF_2OCF(CF_3)CH_2NCO$, $(OCNCH_2CF_2OCF_2)_2$ $OCNCH_2(CF_2OCF_2)_4CH_2NCO$ $OCNCH_2(CF_2OCF_2)_8CH_2NCO$ $OCNCH_2(CF_2CF_2OCF_2CF_2)_4CH_2NCO$ $OCNCH_2CF_2O(CF_2)_4OCF_2CH_2NCO$ $OCNCF(CF_3)OCF_2CF(CF_3)O(CF_2)_5$
$OCF(CF_3)CF_2OCF(CF_3)CH_2NCO$ and the like.

Regardless of the type of diisocyante used, the amount to be used, based on the average hydroxyl functionality of the methylol-terminated prepolymer, will be sufficient to provide a mole ratio of NCO/OH in the range of 0.8 to 1.2. A stoichiometric amount of the diisocyanate will be sufficient to form polyurethanes which are rubbery and are useful, e.g., as binders; less than stoichiometric, will give softer polyurethane elastomers having greater elongation under stress, and more than the stoichiometric will give polyurethanes with higher strengths.

The methylol-terminated prepolymer and diisocyanate can be admixed to form a viscous, homogeneous solution. In order to get this homogeneous solution, it may be necessary to heat the mixture, e.g. 1–2 hours at 100° C., and get a partial reaction between the two components. Alternatively, cosolvents, such as acetone or tetrahydrofuran, can be used to form a solution, the solvent thereafter being stripped. The homogeneous solution can be poured or cast in a mold of desired shape, and the material heated to effect curing or crosslinking. Curing temperatures in the range of 25 to 125° C. will be useful in general, depending on the particular diisocyanate and prepolymer, and whether curing catalysts are used. Higher temperatures, e.g., up to 200° C., are not necessary, and may result in decomposition of the urethane linkages. The use of curing catalysts, such as tertiary amines, e.g., N-methyl morpholine, ferric acetyl acetonate, and di-n-butyl tin dilaurate, etc., in catalytic amounts, will enable the use of lower curing temperatures, e.g., 25 to 40° C. In any case, the optimum curing temperature and duration of cure, can be determined empirically by simple routine tests.

The novel fluorine-containing aliphatic diisocyanates used in this invention can be prepared by reacting phosgene with the corresponding fluorine-containing diamine or diamine hydrochloride precursors which have general formulas like those Formulas 3 and 4 above, except that in place of isocyanate groups (—NCO) there are amine groups (—$NH_2$), or amine hydrochloride groups (—$NH_2 \cdot HCl$). Preparation of the diisocyanate is preferably carried out by dissolving the diamine precursor in a solvent, such as tetrahydrofuran, diglyme, or chlorobenzene. Alternatively, a slurry of the diamine hydrochloride in these solvents can be prepared. In any event, the phosgene is bubbled through the solution or slurry at a suitable temperature, e.g. 0 to 120° C. for a period of time sufficient to get the desired conversion. For this purpose, the course of phosgenation can be followed by running infrared spectral analysis on withdrawn samples of the reaction mixture. When the infrared spectrum shows the conversion of most of the intermediate carbamoyl chloride to diisocyanate, the solvent is stripped, and the residue distilled to obtain the diisocyanate product.

The oxydiamine precursors themselves can be prepared by reduction of the corresponding diamide or dinitrile precursor with a reducing agent, such as lithium aluminum hydride. These oxydiamide and dinitrile precursors and their preparation are disclosed in said copending application Ser. No. 763,357. In the event that the diamine precursor does not have an ether linkage, these and their preparation are known in the art.

In some applications of the polyurethane of this invention, it may be desirable to use a plasticizer to facilitate the mixing or compounding of the prepolymer with other materials, such as fillers, e.g., diatomaceous earth, or propellant ingredients, e.g., oxidizer, fuel, etc. Conventional plasticizers can be used for this purpose, such as tributyl phosphate. For use of the polyurethane of this invention as a propellant binder, however, I prefer to use hydride-terminated poly(perfluoroalkylene oxides) which have the same backbone as the methylol-terminated prepolymers described above but instead of being terminated with methylol, they are terminated with a hydrogen atom. These hydrides can be prepared by pyrolyzing or thermally decomposing the carboxylic acid salt precursors in a high-boiling solvent, such as ethylene glycol, containing active hydrogen. These hydride polymers are admixed as plasticizers, in a plasticizing amount, with the solution of methylol-terminated prepolymer and diisocyanate, and the plasticizer-solution heated to effect curing of the prepolymer. The presence of the hydride-terminated poly(perfluoroalkylene oxide) plasticizer serves to improve the low temperature properties, e.g., the glass transition temperature, of solid propellants.

The polyurethane products of this invention can be used as high density binders in solid rocket propellants of the composite type. In such application, the general procedure used involves blending the admixture or solution of methylol-terminated prepolymer and diisocyanate with the propellant oxidizer (e.g., ammonium perchlorate) and fuel (e.g., aluminum powder), and other conventional propellant additives, shaping the resulting mixture in the form of a grain by means of casting the mixture in a mold, and then heating the shaped grain at elevated temperatures to effect the crosslinking of the prepolymer by the diisocyanate to form a finished grain.

Generally, the propellant oxidizer will be an inorganic oxidizing salt, such as the ammonium, alkali metal, and alkaline earth metal salts of nitric, perchloric, and chloric acids. Mixtures of these oxidizing salts can also be used. Ammonium nitrate and ammonium perchlorate are the preferred oxidizers for use in the solid propellant compositions of this invention. Other applicable oxidizers representatively include sodium nitrate, potassium perchlorate, strontium chlorate, lithium chlorate, calcium nitrate, barium perchlorate, and the like. In the preparation of the propellant compositions, the oxidizers are powdered to sizes generally in the range of from 1 to 300 microns average particle size, preferably in the range between 20 and 200 microns. The propellant fuel will be a powdered metal, such as aluminum or boron, e.g., with a particle size in the range of 20 to 200 microns.

The amount of solid oxidizer and fuel (e.g., powdered aluminum) employed will usually be a major proportion of the total composition, and is generally in the range between 50 and 85 percent by weight of the total mixture. The binder in the propellant composition will usually be a minor proportion of the total composition, and is generally in the range between 15 and 50 percent by weight of the total mixture.

The propellant compositions of this invention can also contain various other conventional compounding ingredients, such as plasticizers, antioxidants, wetting agents, curing agents, metal oxides, reinforcing agents, powdered metals, and the like. The finished "propellant" usually contains these other compounding ingredients, and the quoted term will be used generically herein to cover the mixture of the fluorocarbon polymer with these other ingredients, unless otherwise noted.

The propellant composition of this invention can be formed into a grain having any desired shape or geometry, such as grains of the internal, external, and internal-external burning types, and geometries which provide progressive, neutral, or degressive modes of burning.

Further details on the use of the polyurethanes of this invention as propellant binders will be omitted in the interest of brevity, since the physical and manipulative steps in preparing solid propellants is well-known in the art (see, for example, U.S. Pat. No. 3,050,423).

As mentioned, the polyurethanes of this invention are solid, rubbery crosslinked polymers of high molecular weight. Essentially all of the crosslinkages are urethane moieties. Because of the perfluoro nature of the prepolymer backbone, the resultant polyurethane is highly fluorinated and thus has a desirably high degree of thermal and oxidative stability. And because of the ether linkages in the backbone, the resultant polyurethane has a desirably high degree of flexibility, as evidenced by low glass transition temperatures and good elongation. The polyurethanes also have good hydrolytic stability, thus enabling their use in the fabrication of shaped articles, such as O-rings, gaskets, etc., which are subject to moisture during use or which come into contact with aqueous solvents or water. Because the average hydroxyl functionalities of the prepolymers are greater than 2, it is possible to use stoichiometric amounts of isocyanates which are di-functional as crosslinking or curing agents, thus avoiding allophanate formation and obviating the need for undesirably high curing temperatures.

EXAMPLES

The objects and advantages of this invention are further illustrated in the following examples, but it should be understood that the various materials recited in these examples, and the amounts thereof, and the various steps, conditions, and other details, recited in these examples, should not be construed to unduly limit this invention. In these examples, in the interest of brevity and readability, the abbreviation "MTPFO" means methylol-terminated poly(perfluorotetramethylene oxide), whose properties are shown in Table I above.

Example 1

To 1.6 g. (0.0024 equivalents) of liquid MTPFO prepolymer ($\bar{M}_n$ 1700, average hydroxyl functionality 2.6) is added 0.22 g. (0.0025 equivalent) of 2,4-tolylene diisocyanate (TDI). The mixture is heated and stirred intermittently in a 100° C. oven until homogeneous (about 2 hrs.). The prepolymer-TDI solution gels after 20 hrs. at 100° C. and is completely cured after an additional 20 hrs. at 125° C. to yield a transparent polyurethane elastomer. Following the curing reaction by infrared analysis reveals the gradual disappearance of the isocyanate (—NCO) absorption at 4.4 microns and the formation of the strong urethane carbonyl (NHCOO—) peak at 5.8 microns in the cured rubber. The tensile strength at 100% elongation for this rubber polyurethane product is 20 p.s.i. and the glass transition temperature (Tg) is −12° C. A like amount of said MTPFO prepolymer cured with 0.0030 equivalent of TDI yields a tough rubber with a tensile strength of 72 p.s.i. at 100% elongation and a Tg of +4° C. Both of the polyurethanes of this example are hydrolytically stable—they gain less than 1% in weight, with no observable physical property change, over a 3-month period when immersed in water at room temperature, and exhibit no noticeable change in properties after 12 days immersion in water at 70° C.

Example 2

The MTPFO prepolymer (1.45 g., 0.00024 equiv.) of Example 1 is mixed with tetrafluoro-m-phenylene diisocyanate (TPDI) (0.24 g., 0.0021 equiv.) and stirred at 80° C. The mixture is homogeneous in 15 min. and gels in about 4 hrs. at 80° C. After an additional 20 hrs. at 80° C. and 24 hrs. at 125° C., the cured polyurethane rubber has the following properties: 10 p.s.i. tensile strength at 40% elongation and a Shore A–2 hardness of 30.

Curing 1.3 g. (0.0022 equiv.) of MTPFO prepolymer as above with 0.26 g. (0.0022 equiv.) of TPDI yields a polyurethane rubber with 90 p.s.i. tensile strength at 40% elongation and a Shore A–2 hardness of 60. MTPFO prepolymer (1.38 g., 0.0023 equiv.) cured with 0.33 g. (0.0028 equiv.) of TPDI yields a firm polyurethane rubber with 660 p.s.i. tensile strength at 40% elongation and a Shore A–2 hardness of 85.

Example 3

The MTPFO prepolymer (2.7 g., 0.0045 equiv.) of Example 1 is mixed with 0.35 g. (0.0045 equiv.) of oxydi-(ethylisocyanate) and heated at 80° C. until homogeneous (45 min.). After an additional hour of heating, the mixture is cast into a rectangular mold. The mold is heated for 4 days at 80° C. to yield a transparent polyurethane rubber, Tg −40° C.

Example 4

The MTPFO prepolymer (2.6 g., 0.0043 equiv.) of Example 1 is stirred with 0.37 g. (0.0044 equiv.) of hexamethylenediisocyanate (HDI) at 80° C. for 45 min. to to obtain homogeneity. Curing for 4 days at 80° C. yields a very flexible polyurethane elastomer, Tg −52° C.

Example 5

The MTPFO prepolymer (2.4 g., 0.0040 equiv.) of Example 1 is mixed with 0.72 g. (0.0044 equiv.) of oxybis(1,1 - dihydroperfluoropropylisocyanate) (OBDI) and the mixture stirred intermittently at 80° C. for 11 min. to obtain homogeneity. After additional hour of heating at 80° C., the prepolymer-isocyanate solution is cast into a polytetrafluoroethylene mold, the mold is covered with an air tight cover (to prevent evaporation of curing agent), then heated at 80° C. for 4 days to yield a transparent polyurethane rubber, Tg −24° C.

Example 6

A 0.67 g. sample of MTPFO prepolymer of Example 1 is mixed with 0.29 g. (27% by weight) of hydride-terminated poly(perfluorotetramethylene oxide) plasticizer, $H(CF_2CF_2OCF_2CF_2)_nH$ (prepared by the decarboxylation of $HOOC(CF_2CF_2OCF_2CF_2)_nCOOH$). The homogeneous solution thus prepared is cured with 0.11 g. of tolylene diisocyanate for 3 days at 80° C. to yield a cured polyurethane rubber which is more flexible than a similar polyurethane rubber specimen which does not contain the hydride polymer plasticizer.

Example 7

A solution of MTPFO prepolymer-OBDI is prepared according to Example 5, cooled to 25° C., and ferric acetyl acetonate is added (0.3% by weight) and mixed to dissolve. Heating the resulting solution at 40° C. causes gelation in 20 min. (or in 10 min. at 60° C.). The resulting gelled product is cured 3 days at 40° C. to yield a rubbery polyurethane, Tg, −20° C.

Example 8

A MTPFO prepolymer-HDI solution is prepared according to Example 4 and cast onto a woven glass fabric. The resulting impregnated fabric is cured at 100° C. for 1 day followed by 3 days at 125° C. The cured polyurethane elastomer-glass cloth composition is useful as gasketing material at temperatures from −196° C. to 150° C.

Example 9

A MTPFO prepolymer-TDI solution is prepared according to Example 1. To about 1.5 g. of this solution is added about 0.10 g. of an inert powdered siliceous commercial thickening agent, Cab-O-Sil M–6. The resulting very thixotropic mixture is employed as a sandwich filling or seal between two small aluminum panels. This structure is placed in an oven at 60° C. for one day then in a 100° C. oven for 3 days to yield the cured structure.

Examples 10–15

Five runs (Examples 10–14) are made in which samples of the MTPFO prepolymer are cured with varying amounts of TDI, following the procedure of Example 1, and one run (Example 15) is made in which the MTPFO prepolymer is cured with TPDI, following the procedure of Example 2. In all of these runs, rubbery polyurethanes are obtained. These runs and the properties of the resulting polyurethane are summarized in Table II below. In Examples 11, 12 and 15, after an initial curing step, the products are post-cured at slightly higher temperatures to determine the effect of post-curing on product properties.

TABLE II

| Examples | 10 | 11 | 12 | 13 | 14 | 15 |
|---|---|---|---|---|---|---|
| MTPFO prepolymer used: | | | | | | |
| Molecular wt. ($\overline{M}_n$) | 2,500 | 1,375 | 1,750 | 2,500 | 2,500 | 1,375 |
| OH functionality avg | 2.7 | 2.5 | 2.7 | 2.7 | 2.7 | 2.5 |
| Isocyanate used | TDI | TDI | TDI | TDI | TDI | TPDI |
| NCO/OH equiv. ratio | 0.83 | 0.87 | 0.95 | 1.1 | 1.6 | 0.9 |
| Curing: | | | | | | |
| Temp., ° C | 100 | 100 | 100 | 100 | 100 | 100 |
| Time, hrs | 18 | 96 | 20 | 18 | 40 | 96 |
| Postcuring: | | | | | | |
| Temp., ° C | | 125 | 125 | | | 125 |
| Time, hrs | | 24 | 20 | | | 24 |
| Polyurethane properties: | | | | | | |
| Hardness, Shore A2 | (a) | 15 | 20 | (b) | (c) | 20 |
| Tensile strength, p.s.i. | (a) | 30 | 37 | (b) | (c) | 37 |
| Elongation, percent | (a) | 260 | 180 | (b) | (c) | 120 | a Product was a tacky rubber.
b Product was a soft rubber.
c Product was a tough rubber.

Examples 16–20

Five runs are made in which samples of MTPFO ($\overline{M}_n$ 1500, equiv. wt. 600, OH functionality 2.5) is cured with equivalent amounts of various isocyanates at 80° C. for 4 days, and the properties of the resulting rubbery polyurethanes determined, to show the effect of the nature of the curing agent on properties. Results are summarized in Table III below.

TABLE III

| Examples | 16 | 17 | 18 | 19 | 20 |
|---|---|---|---|---|---|
| Isocyanate | TDI | TPDI | HDI | ODEI | OBDI |
| Hardness, Shore A2 | 50 | 45 | 30 | 24 | 15 |
| Tg, ° C | −5 | −18 | −52 | −40 | −24 |
| Density, g./cc | 1.81 | 1.88 | 1.74 | 1.80 | 1.85 |
| Tensile strength, p.s.i | 270 | 184 | 65 | 65 | 60 |
| Elongation, percent | 135 | 150 | 60 | 90 | 100 |
| Thermal stability: Wt. loss (96 hrs. at 177° C. in air), percent | 12.4 | 13.6 | 8.8 | 8.4 | 5.4 |
| Thermogravimetric analysis,* ° C | 285 | 280 | 290 | 295 | 320 |

*Temp. at point where 10% in weight is lost, using a temp. rise of 5° C./min. in air.

Example 21

The curing agent of Example 3 viz, oxydi(ethylisocyanate), abbreviated as ODEI and having the structure $O(CH_2CH_2NCO)_2$, is prepared as follows:

Twenty-three ml. (30 g., 0.15 mole) of oxydipropionyl chloride, $O(CH_2CH_2COCl)_2$, in 380 ml. of dry ethyl ether is added over a 30 min. period to a vigorously stirred, cold solution of 38 g. (0.58 mole) of sodium azide in 90 ml. water in a 1 liter, 3-neck, round bottom flask. The temperature of the mixture is kept between 5–10° C. by cooling with ice during the addition. Vigorous stirring is continued for 1.6 hrs. (ice bath). An infrared analysis of the residue from the evaporation of a 2 ml. sample is consistent for azide, $O(CH_2CH_2CON_3)_2$. The ether layer is washed with 50 ml. of cold, saturated aqueous sodium bicarbonate solution then allowed to stand over anhydrous sodium sulfate overnight. The ether solution is filtered and refluxed for 1 hr. Dry benzene is added and the ether distilled off slowly while gas evolution increases with increasing pot temperature. The benzene solution is refluxed two hrs. and the benzene stripped off under vacuum and the residual liquid distilled through a short path apparatus to yield 19.5 g. (83.5%) of $$O(CH_2CH_2NCO)_2$$

B.P. 87–88° C./2.5 mm. Redistillation through a 6″ Vigreux column affords a pure sample, B.P. 92° C./2.5 mm., of the oxydi(ethylisocyanate).

Example 22

In this example, the preparation of the oxybis(1,1-dihydroperfluoropropylisocyanate), OBDI, curing agent of Example 5 is described, using the corresponding diamine precursor, whose preparation is initially described.

A solution of 55 g. (0.18 mole) of $O(CF_2CF_2CONH_2)_2$ obtained by ammonolysis of the corresponding diester, in a mixture of 400 ml. diethyl ether and 85 ml. diglyme, is added over a one-hour period to a stirred mixture of 28.5 g. (0.75 mole) of lithium aluminum hydride in one liter of diethyl ether in a two-liter flask fitted with Hershberg stirrer (air motor), condenser, drying tube, dropping funnel and $N_2$ inlet. The mixture is stirred and refluxed overnight. Then, 100 ml. of water is added and the ether layer is saturated with anhydrous HCl. The finely divided precipitate is filtered to yield 44.5 g.

$$O(CF_2CF_2CH_2NH_2 \cdot HCl)_2$$

The latter salt (39 g.) is treated with 200 ml. of about 20% NaOH solution. The liberated amine is extracted with ether, the solution is dried over $CaSO_4$, filtered, and concentrated. The residual liquid is fractionated by means of a 6″ Vigreux column to yield 27 g. (0.10 mole 55% from amide) of colorless liquid $O(CF_2CF_2CH_2NH_2)_2$, B.P. 94–94.5° C./23 mm., $n_D^{22}$ 1.3507, $d_4^{20}$ 1.51.

To a dry 250 ml. flask fitted with stirrer, condenser, thermometer, and a below surface gas inlet tube, is added 130 ml. of redistilled $CH_3OCH_2CH_2OCH_3$ and 22 g. of $O(CF_2CF_2CH_2NH_2)_2$. The solution is cooled with an ice-salt bath to −10° C. and phosgene is bubbled into the solution, while maintaining the temperature below 0° C. Considerable white solid (amine hydrochloride) forms during this procedure. When an acid reaction is noted (with moist pH paper) at the top of the condenser, the flask is heated slowly to reflux while continuing the addition of phosgene. (An infrared spectrum, taken when the pot temperature reaches 70° C., shows mostly —NHCOCl groups present.) Refluxing two days causes the conversion of most of the carbamoyl chloride end groups to isocyanate. The solvent is removed under vacuum and the residual liquid is fractionated through a 6″ Vigreux column to yield 6 gm. of distillate, $O(CF_2CF_2CH_2NCO)_2$ (boiling up to 69° C./1 mm.). Redistillation affords a pure fraction of this diisocyanate.

Example 23

In this example, the preparation of a fluorine-containing aliphatic diisocyanate, useful as a curing agent as described hereinbefore, is described.

In a 1 l. 3-neck flask, a slurry of 25 g. (0.075 mole) of $(CF_2)_4(CH_2NH_2 \cdot HCl)_2$ in 550 ml. chlorobenzene is made. Fifty ml. of the solvent was distilled off to remove any water. Phosgene is bubbled in for 6 hrs. at 60–90° C., followed by an $N_2$ purge at 95–100° C. The solution is filtered and concentrated by distillation of the solvent at reduced pressure to give approximately 2 ml. of crude diisocyanate. Distillation yields 1 g. of colorless liquid, $(CF_2)_4(CH_2NCO)_2$, B.P. 55° C./0.14 mm.

Example 24

The preparation of hydride plasticizer of Example 6 is described below.

An amount of 9.1 g. of carboxy-terminated perfluorotetramethylene oxide prepolymer (the preparation of which is disclosed in said copending application), having a molecular weight $\overline{M}_n$ of 2,000, is dissolved in 50 ml. ethyl ether and titrated to a pH of 11.5–12 with aqueous NaOH. The ether and water are evaporated and the solid is dried 4 hrs. in an 80° C. vacuum oven. The dry powdered salt (8.1 g.) is placed in a 50 ml. 3-neck flask equipped with $N_2$ source below the surface, and water cooled condenser. Twenty ml. of ethylene glycol is added and the mixture is refluxed under $N_2$ for 20 hrs. (195–200° C.). The mixture is cooled to room temperature and is poured into a separatory funnel. Thirty ml. Freon 113 trichlorotrifluoroethane and 30 ml. of $H_2O$ are added and mixed well, the organic layer is removed, and the solvent is evaporated under reduced pressure at 80° C. for 45 min., yielding said hydride.

Example 25

The preparation of a solid propellant is described in this example, using MTPFO prepolymer ($\overline{M}_n$ 1300, OH functionality 2.6).

To a mixture of the MTPFO prepolymer, a slight stoichiometric excess of hexamethylene diisocyanate curing agent, and a trace of dibutyltin diacetate curing catalyst, is added with mixing, at 60° C., 28 wt. percent of aluminum powder and 51 wt. percent of ammonium perchlorate, these wt. percents being based on the weight of the total mixture. The resulting propellant slurry mixture is mixed until of uniform composition and then part of it is cast into strands and part cast in the form of a larger propellant grain. Final cure is effected by heating the cast strand and grain samples at 60° C. for about 6 days. The strands are ignited and show a burning rate of 0.25–0.30 in./min. and a pressure exponent of 0.5, properties which are comparable to conventional composite propellants.

Various modifications and alterations of this invention will become apparent to those skilled in the art without departing from the scope and spirit of this invention, and it should be understood that this invention is not to be unduly limited to the illustrative embodiment set forth herein.

I claim:
1. Rubbery polyurethane formed by curing methylol-terminated poly(perfluoroalkylene oxide) prepolymer, having an average hydroxyl functionality greater than 2 to as much as 5 and an average molecular weight of 500 to 10,000, with a polyisocyanate, said prepolymer having methylol terminated backbone segments of repeating units of the formula $\{(C_mF_{2m})O(C_nF_{2n})\}$ and one or more random branch segments of the formula

where R is a methylol terminated side chain made of repeating units of said formula $\{(C_mF_{2m})\}$—$\{(C_nF_{2n})\}$, where $m$ and $n$ are integers of 1 to 8 the amounts of said prepolymer and polyisocyanate being sufficient to provide a mole ratio of NCO/OH in the range of 0.8/1 to 1.2/1.

2. Rubbery polyurethane according to claim 1, wherein said prepolymer comprises a mixture of

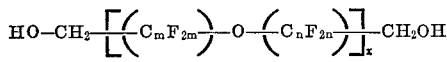

and

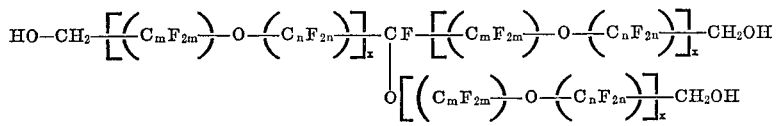

where $m$ and $n$ are integers from 1 to 8, and $x$ is an average integer from 2 to 8.

3. Rubbery polyurethane according to claim 1, wherein said prepolymers have an average hydroxyl functionality of 2.1 to 2.8.

4. Rubbery polyurethane according to claim 1, wherein said prepolymer is methylol-terminated poly(perfluorotetramethylene oxide).

5. Rubbery polyurethane according to claim 1, wherein said polyisocyanate is an aliphatic or aromatic diisocyanate.

6. Rubbery polyurethane according to claim 1, wherein said polyisocyanate is a fluorine-containing aliphatic diisocyanate.

7. Rubbery polyurethane according to claim 1, wherein said polyisocyanate has a general formula selected from the following

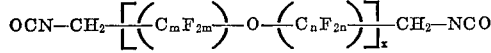

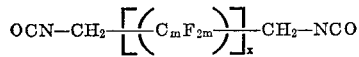

where $m$ and $n$ are integers from 1 to 8 and $x$ is an integer from 1 to 12.

8. Rubbery polyurethane according to claim 1, wherein said polyisocyanate is oxybis(1,1-dihydroperfluoropropylisocyanate).

9. Rubbery polyurethane according to claim 1, wherein said polyisocyanate is selected from the group consisting of 2,4-tolylene diisocyanate, tetrafluoro-m-phenylene diisocyanate, oxydi(ethylisocyanate), or hexamethylenediisocyanate.

10. A shaped article comprising the rubbery polyurethane of claim 1.

11. A solid propellant of the composite type comprising oxidizer, fuel, and the rubbery polyurethane of claim 1 as the binder for said propellant.

12. A composition comprising a mixture of a methylol-terminated poly(perfluoroalkylene oxide) prepolymer, with an average hydroxyl functionality greater than 2 to as much as 5 and a molecular weight of 500 to 10,000, and a polyisocyanate, said prepolymer having methylol terminated backbone segments of repeating units of the formula $\{(C_mF_{2m})O(C_nF_{2n})\}$ and one or more random branch segments of the formula

where R is a side chain made of methylol terminated repeating units of said formula $\{(C_mF_{2m})O(C_{n2n})\}$, where $m$ and $n$ are integers of 1 to 8, the amounts of said prepolymer and polyisocyanate being sufficient to provide a mole ratio of NCO/OH in the range of 0.8/1 to 1.2/1.

References Cited
UNITED STATES PATENTS

| | | | |
|---|---|---|---|
| 3,452,103 | 6/1969 | Trischler | 260—77.5 |
| 3,463,762 | 8/1969 | Trischler | 260—77.5 |

FOREIGN PATENTS

| | | | |
|---|---|---|---|
| 797,795 | 7/1958 | Great Britain | 260—77.5 |

OTHER REFERENCES

NASA sp–5901(01)—Synthesis of Fluorinated Hydrocarbons, 1968, pp. 13, 14 and 16.

Hollander, J., et al., Journal of Polymer Science, Part A–1, vol. 5, 2757–2767 (1967).

PAUL LIEBERMAN, Primary Examiner

U.S. Cl. X.R.

260—77.5 AT, 453 AL, 453 PH, 584 B, 858; 149—19

PO-1050
(5/69)

UNITED STATES PATENT OFFICE
CERTIFICATE OF CORRECTION

Patent No. 3,642,705                     Dated  February 15, 1972

Inventor(s)    Joseph LaMar Zollinger

It is certified that error appears in the above-identified patent and that said Letters Patent are hereby corrected as shown below:

Claim 1, line 12 (i.e., col. 11, line 14) the formula should read -- $(C_mF_{2m})-O-(C_nF_{2n})$ --.

Signed and sealed this 25th day of July 1972.

(SEAL)
Attest:

EDWARD M. FLETCHER, JR.          ROBERT GOTTSCHALK
Attesting Officer                 Commissioner of Patents